(12) United States Patent
Huffer

(10) Patent No.: US 9,643,766 B1
(45) Date of Patent: May 9, 2017

(54) PRECISION SCORED WRAPPER FOR IN HOME USE

(71) Applicant: Sonoco Development, Inc., Hartsville, SC (US)

(72) Inventor: Scott William Huffer, Hartsville, SC (US)

(73) Assignee: Sonoco Development, Inc., Hartsville, SC (US)

( * ) Notice: Subject to any disclaimer, the term of this patent is extended or adjusted under 35 U.S.C. 154(b) by 0 days.

(21) Appl. No.: 15/076,744

(22) Filed: Mar. 22, 2016

(51) Int. Cl.
| | |
|---|---|
| *B65D 65/00* | (2006.01) |
| *B65D 65/14* | (2006.01) |
| *B65B 61/02* | (2006.01) |
| *B32B 37/12* | (2006.01) |
| *B32B 37/14* | (2006.01) |

(52) U.S. Cl.
CPC .......... *B65D 65/14* (2013.01); *B32B 37/1284* (2013.01); *B32B 37/14* (2013.01); *B65B 61/02* (2013.01); *B32B 2553/00* (2013.01)

(58) Field of Classification Search
CPC ..... B65D 65/14; B32B 37/1284; B32B 37/14; B65B 61/02
USPC ........... 229/87.01, 87.08, 87.18, 87.19, 92.8; 428/42.2, 42.3
See application file for complete search history.

(56) References Cited

U.S. PATENT DOCUMENTS

| | | | | |
|---|---|---|---|---|
| 3,315,386 | A * | 4/1967 | Kest | G09F 3/02 283/105 |
| 4,060,168 | A * | 11/1977 | Romagnoli | B65D 75/54 156/248 |
| 4,351,473 | A * | 9/1982 | Manizza | B65D 5/2047 229/123.2 |
| 4,877,674 | A | 10/1989 | Kappes | |
| 5,201,133 | A * | 4/1993 | Best | A47G 1/0633 40/745 |
| 5,279,692 | A * | 1/1994 | Best | A47G 1/0633 156/257 |
| 5,518,787 | A * | 5/1996 | Konkol | G09F 3/02 428/195.1 |
| 6,135,507 | A * | 10/2000 | Hamby | B42D 15/00 283/101 |
| 6,403,191 | B1 * | 6/2002 | Casagrande | B32B 7/06 283/81 |
| 6,432,499 | B1 * | 8/2002 | Roth | G09F 3/02 283/101 |
| 6,596,359 | B2 * | 7/2003 | Roth | B31D 1/021 156/250 |
| 7,438,322 | B2 * | 10/2008 | Miller | G09F 3/0288 283/101 |
| 7,717,620 | B2 * | 5/2010 | Hebert | B29C 59/007 383/116 |

(Continued)

*Primary Examiner* — Jes F Pascua
(74) *Attorney, Agent, or Firm* — Miller, Matthias & Hull LLP

(57) ABSTRACT

A ready-made wrapper that can be used at home to wrap an article such as a snack bar and a method of making same is provided. The wrapper is a precision scored laminate comprising a flexible bottom layer adhered to a flexible top layer at least in part by a pressure sensitive adhesive (PSA). In one embodiment the bottom layer is scored so that one or more peripheral portions of the bottom layer can be removed and discarded, leaving a wrapper having an adhesive perimeter. After an article is placed in the center of the wrapper, the wrapper can be folded around the article to create an airtight package.

6 Claims, 6 Drawing Sheets

(56) References Cited

U.S. PATENT DOCUMENTS

| | | | | |
|---|---|---|---|---|
| 8,114,451 | B2* | 2/2012 | Sierra-Gomez | B65D 75/5838 |
| | | | | 206/459.5 |
| 8,236,400 | B2* | 8/2012 | Trigg | B44C 1/105 |
| | | | | 40/299.01 |
| 8,262,830 | B2* | 9/2012 | Hebert | B29C 59/007 |
| | | | | 156/253 |
| 8,262,832 | B2* | 9/2012 | Hebert | B29C 59/007 |
| | | | | 156/253 |
| 8,545,099 | B2* | 10/2013 | Davis | B29C 59/007 |
| | | | | 220/266 |
| 9,162,414 | B2* | 10/2015 | Huffer | B32B 27/00 |
| 2008/0093427 | A1* | 4/2008 | Kuranda | B65B 11/00 |
| | | | | 229/87.05 |
| 2010/0136277 | A1* | 6/2010 | Hodsdon | G09F 7/12 |
| | | | | 428/41.8 |
| 2011/0103718 | A1* | 5/2011 | Bosman | B65D 75/008 |
| | | | | 383/66 |
| 2011/0147255 | A1* | 6/2011 | Kuranda | B65B 11/00 |
| | | | | 206/459.5 |
| 2015/0320605 | A1 | 11/2015 | Pigg et al. | |
| 2016/0096667 | A1* | 4/2016 | Huffer | B65D 25/54 |
| | | | | 220/257.2 |
| 2016/0200472 | A1* | 7/2016 | Kuranda | B65B 11/00 |
| | | | | 156/249 |

* cited by examiner

PRECISION SCORED WRAPPER FOR IN HOME USE

BACKGROUND OF THE INVENTION

Field of the Invention

This disclosure relates to flexible packaging. More particularly, this disclosure relates to a ready-to-use, precision scored, flexible wrapper that can be used at home to wrap food items such as home-made snack bars without requiring any equipment.

Description of the Related Art

Ready to eat snack bars are a popular part of many American's diet. A need has been identified for a combination snack bar and wrapping kit that can be used at home to prepare and wrap food items such as snack bars for later consumption. The present disclosure is designed to address this need.

In one aspect the kit comprises ingredients to make the snack bars and materials for wrapping the snack bars once they've been made at home by the consumer. Rather than using metal foil, plastic wrap or a wrap that requires a heat sealing machine, the consumer can use the materials in the kit to wrap the bars without requiring any equipment.

BRIEF SUMMARY OF THE INVENTION

The present disclosure relates to a ready-made wrapper that can be used at home to wrap an article such as a snack bar and a method of making same. The wrapper is a precision scored laminate comprising a flexible bottom layer adhered to a flexible top layer at least in part by a pressure sensitive adhesive (PSA).

In one embodiment the bottom layer is scored so that one or more peripheral portions of the bottom layer can be removed and discarded, leaving a wrapper having an adhesive perimeter. After an article is placed in the center of the wrapper, the wrapper can be folded around the article to create an airtight package. The bottom layer may include one or more pull tabs to facilitate removal of the one or more peripheral portions.

In another embodiment both the bottom layer and the top layer are scored so that peripheral portions of both the top and bottom layers can be removed and discarded, leaving a wrapper having an adhesive perimeter. The bottom layer has a perimeter and a die cut formed therein which divides a bottom layer peripheral portion from a bottom layer central portion. The top layer has a perimeter and a die cut formed therein which divides the top layer into an outer peripheral portion and an inner peripheral portion. An adhesive layer is disposed between the bottom layer and the top layer and comprises at least in part a pressure sensitive adhesive.

The top layer die cut has a larger perimeter than the bottom layer die cut. The top layer has an underside that faces the bottom layer. The top layer also comprises a central portion that is coextensive with the bottom layer central portion. The top layer inner peripheral portion surrounds the top layer central portion, and the top layer outer peripheral portion surrounds the inner peripheral portion.

DETAILED DESCRIPTION OF THE INVENTION

Figure 1:
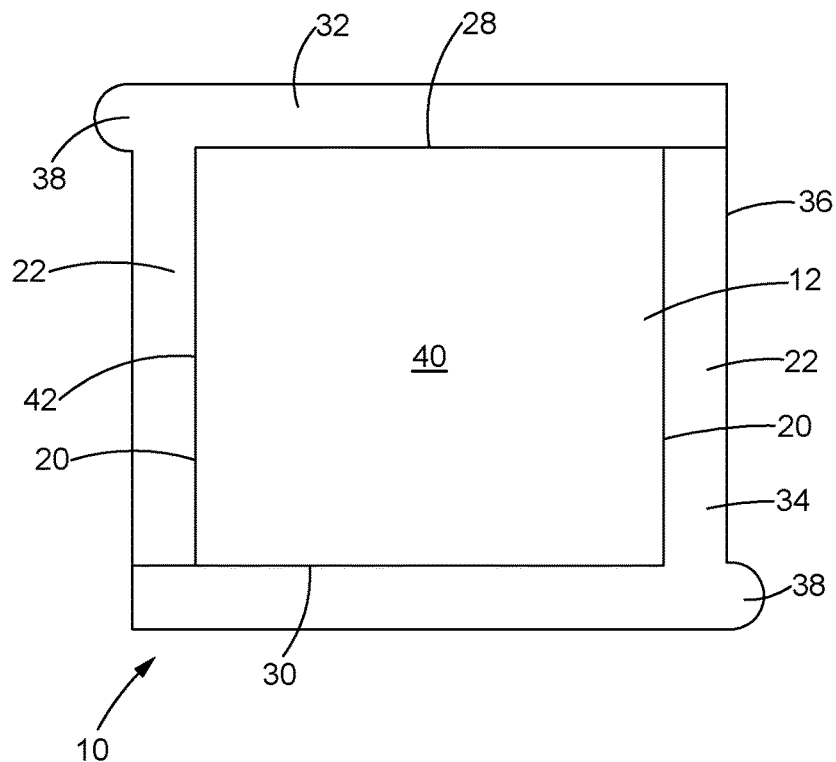
FIG. 1 is a bottom view of a wrapper according to the disclosure.

While the invention described herein is embodied in many forms, there is shown in the drawings and will herein be described in detail one or more embodiments with the understanding that this disclosure is to be considered an exemplification of the principles of the invention and is not intended to limit the disclosure to the illustrated embodiments. Aspects of the different embodiments can be combined with or substituted for one another.

Figure 3:
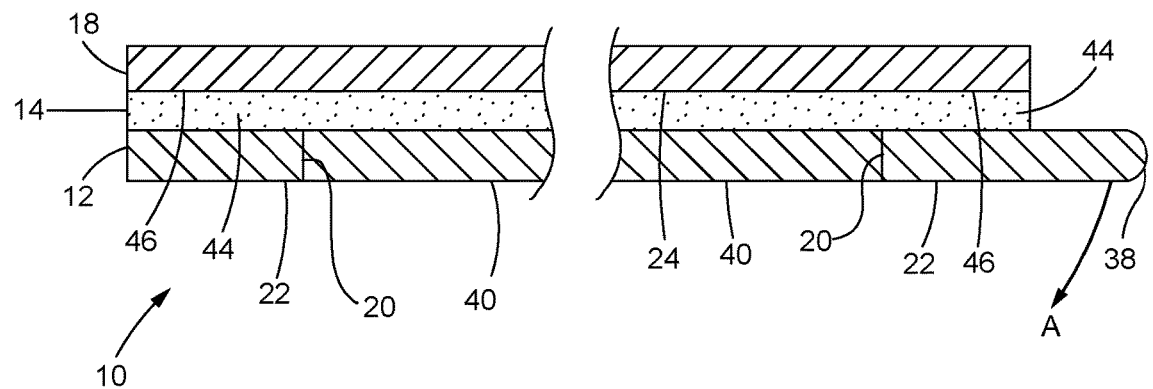
FIG. 3 is a cross-sectional view of the wrapper of FIG. 2 taken along line 3-3.

As will be appreciated, terms such as "above" and "below", "upper" and "lower", "top" and "bottom," "front" and "back," (etc.), used as nouns, adjectives or adverbs refer in this description to the orientation of the structure of the wrapper as it is illustrated in the cross sectional views, such as FIGS. 3, 4, 8 and 9. For example, "bottom layer" refers to the bottom layer of the wrapper as seen in FIG. 3 and "top layer" refers to the refers to the bottom of the wrapper as seen in FIG. 3. Such terms are not intended to limit the invention to a particular orientation.

Turning to the drawings, where like numerals indicate like elements, there is shown in FIG. 1 a bottom view of a wrapper 10 according one embodiment of the present invention. Rather than using foil or plastic wrap or a wrap that requires a heat sealing machine, the consumer can use the wrapper 10 to wrap the food item without requiring any equipment. The wrapper 10 comprises a bottom layer 12 of flexible material. The bottom layer 12 may be scored in such a way to create one or more removable peripheral portions 22, leaving a central portion 40. The bottom layer 12 has an edge or perimeter 36 that may be rectangular or any suitable shape.

Figure 2:
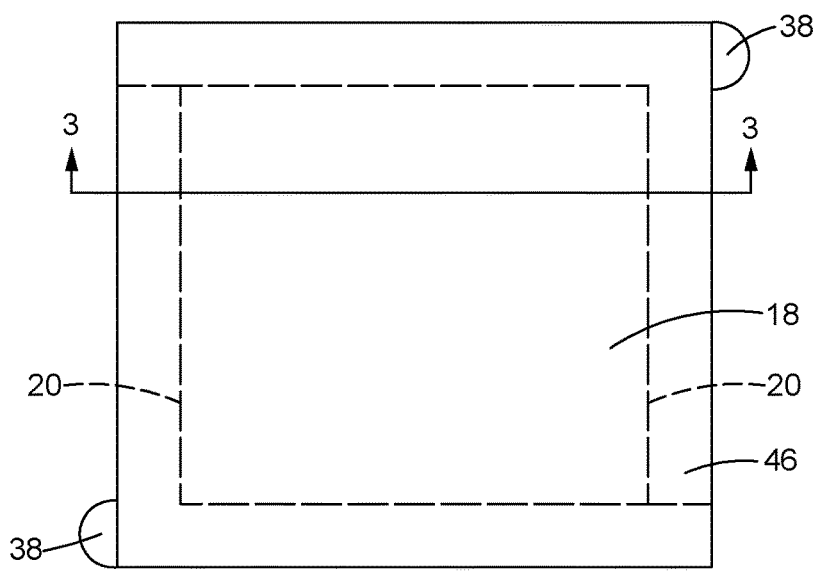
FIG. 2 is a top view of the wrapper of FIG. 1.

FIG. 2 is top view of the wrapper 10 of FIG. 1. The wrapper 10 also comprises a top layer 18 of flexible material. In the illustrated embodiment the top layer 18 is substantially coextensive with the bottom layer 12.

FIG. 3 is a cross-sectional view of the wrapper 10 of FIG. 1 taken along line 2-2. In the illustrated embodiment the wrapper 10 comprises a laminated film having a bottom layer 12 that has been die cut or otherwise scored, a top layer 18 and an adhesive layer 14 disposed between the bottom layer 12 and the top layer 18. An optional ink layer (not shown) can be reverse printed onto the underside 24 of the top layer 18 prior to the application of the adhesive(s) to form an image visible through the top layer 18. When the wrapper 10 is folded and sealed around an item the ink layer provides an attractive outer appearance.

Figure 4:
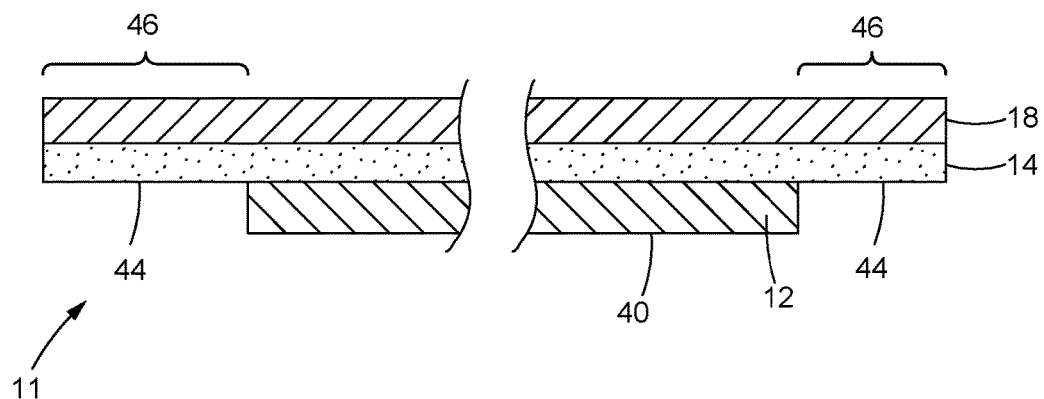
FIG. 4 is a cross-sectional view of the wrapper of FIG. 3 after the peripheral portion of the bottom layer has been removed.

In the illustrated embodiment the bottom layer 12 includes one or more pull tabs 38 that extend beyond the rectangular perimeter 36. These pull tabs 38 are configured to facilitate removal of the one or more peripheral portions 22 of the bottom layer 12 as explained in more detail below. In FIGS. 1 and 2 the bottom layer 12 includes die cuts 20 which help define the peripheral portions 22. Removing the peripheral portions 22 exposes a PSA covered peripheral portion 46 of the top layer 18 as shown in FIG. 4.

The bottom layer die cuts 20 can be any suitable number and shape. For example, as shown in FIG. 1, the die cuts 20 comprise a first L-shaped die cut 28 that, along with the bottom layer perimeter 36, defines a first L-shaped peripheral portion 32. The die cuts 20 also comprise a second L-shaped die cut 30 that, along with the bottom layer perimeter 36, defines a second L-shaped peripheral portion 34.

The bottom layer die cuts 20 may include a continuous rectangular die cut 42 that is smaller than the bottom layer perimeter 36 and thus defines an inner boundary of the bottom layer peripheral portion 22. The continuous rectangular die cut 42 also defines the bottom layer central portion 40. This central portion 40 preferably remains adhered to the top layer 18 at all times.

The adhesive layer 14 comprises in whole or in part a pressure sensitive adhesive (PSA). The PSA may be applied to the entire underside 24 or pattern applied to just part of the underside 24.

The term "pattern applied" as used herein means that the adhesive is applied to the substrate in a pattern that leaves voids in the adhesive layer so as to leave exposed (uncoated) portions of the substrate. For example, in an embodiment of the invention, the PSA is pattern applied to the underside of the top layer along just a peripheral region 46 of the top layer 18 that is substantially coextensive with the bottom layer peripheral portion 22. In this embodiment another adhesive, such as a permanent adhesive, is disposed between the bottom layer 12 and the top layer 18 in the area corresponding to the bottom layer central portion 40 to permanently adhere the bottom layer central portion 40 to the top layer 18.

The bottom layer 12 may be made of any suitable flexible sheet material, such as oriented polypropylene (OPP) or metallized oriented polypropylene (mOPP). "Oriented" means that the film is stretched, either in the machine direction or cross machine direction or both, to increase tensile strength and clarity. "Metallized" means the film surface has been coated with a metal such as aluminum.

Figures 5A, 5B:
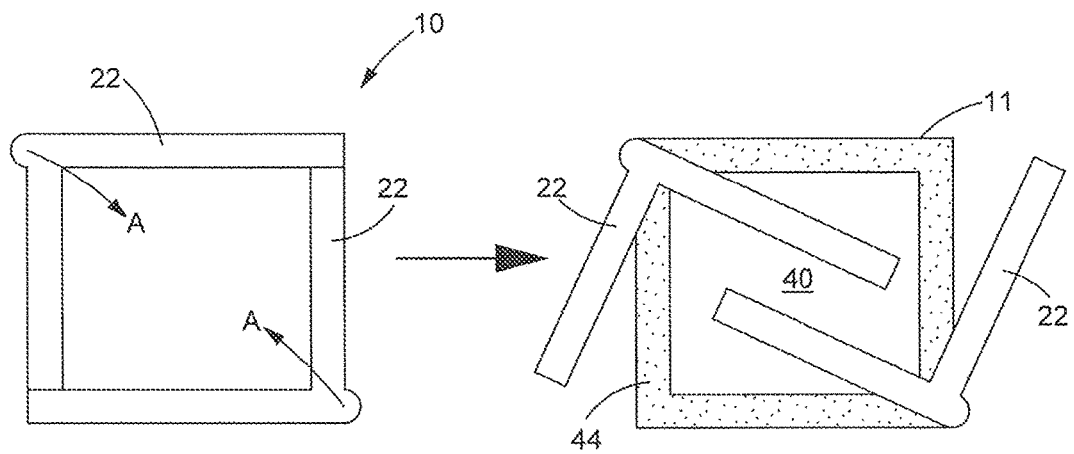
FIGS. 5A to 5E are a series of views showing how the wrapper of FIG. 1 is used to wrap an article.
Figures 5C, 5D:
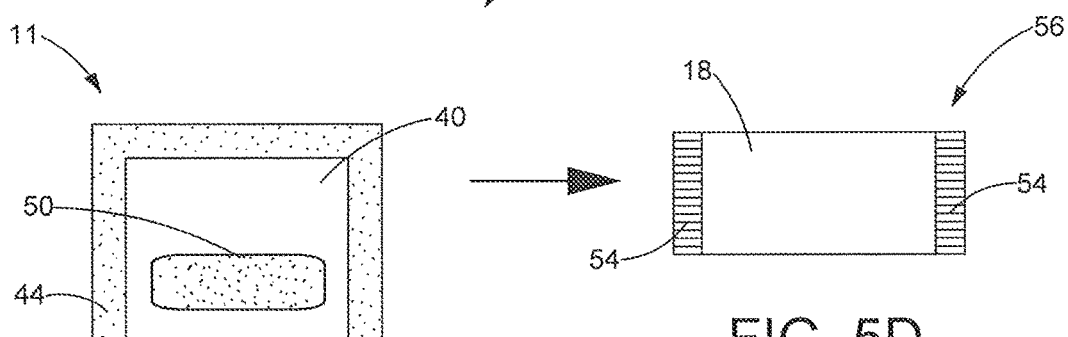
Figure 5E:
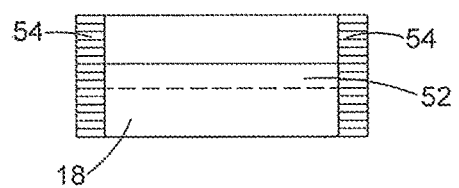

The top layer 18 may be made of any suitable flexible sheet material, such as polyethylene terephthalate (PET). Preferably the top layer 18, which is the layer that forms that outside surface of the wrapped article 56 as shown in FIGS. 5D and 5E, is translucent so that the ink layer, if there is one, can be seen through the top layer 18.

Method of Manufacture

In one embodiment the wrapper 10 is manufactured in the following manner:

Step 1: Apply an adhesive layer 14 comprising PSA and another adhesive to the underside 24 of a top layer 18. The PSA is pattern applied to the underside of the top layer 18 along the peripheral region 46. A more permanent adhesive is applied to the underside of the top layer 18 in the area corresponding to the bottom layer central portion 40. The underside of the top layer 18 may be printed with an ink layer to provide attractive and/or informative graphics that appear through the top layer 18 of the wrapped article 56.

At least one corner of the underside 24 of the top layer 18 is left PSA free so that the bottom layer 12 does not adhere to the top layer 18 in this area, creating a means for pulling the bottom layer 12 from the top layer 18. Alternatively, PSA is applied to the entire underside of the top layer 18, including the peripheral region 46, and the bottom layer 12 is provided with one or more adhesive free pull tabs 38 extending beyond the perimeter 36 of the bottom layer 12. The pull tabs 38 are then used as a means for pulling the bottom layer 12 from the top layer 18.

Step 2: Adhere a bottom layer 12 to the top layer 18 to create a flexible laminate film. The laminate film comprises the bottom layer 12 and the top layer 18 and the adhesive layer 14 interposed between the bottom layer 12 and the top layer 18.

Step 3: Transfer the laminate film to a cutting station and die cut the bottom layer 12 with die cuts 20 to create a bottom layer 12 having a central portion 40 and one or more removable peripheral portions 22. Preferably the die cutting process does not breach any of the other layers of the laminate film beyond the bottom layer 12. The die cut film is now the finished wrapper 10.

Method of Use

FIG. 5 is a diagram showing one way in which the wrapper 10 is used to wrap an article 50, as explained in the following steps:

Step 1: Taking a finished wrapper 10 such as the one shown in FIGS. 1-3, remove the peripheral portion(s) 22 from the bottom layer 12 by lifting a corner of the bottom layer that is not adhered to the top layer 18 or by pulling on the one or more pull tabs 38 in the direction of arrows (A) shown in FIG. 5A. Removing the peripheral portions 22 as shown in FIG. 5B exposes the peripheral portion 44 of the adhesive layer 14 that was previously coextensive with and covered by the peripheral portions 22 of the bottom layer 12.

FIG. 4 is a cross-sectional view of the wrapper 10 after the peripheral portions 22 of the bottom layer 12 have been removed. The exposed peripheral portion 44 of the adhesive layer 14 comprises pressure sensitive adhesive. The area between the top layer 18 and the central portion 40 of the bottom 12 may comprise PSA or another more permanent adhesive.

Step 2: Discard the one or more peripheral portions 22. What remains is an adhesive wrapper 11 that can now be used to wrap an article 50.

Step 3: Place the adhesive wrapper 11 on a flat surface with the top layer 18 down and the exposed peripheral portion 44 of the adhesive layer 14 face up. Place an article 50 (such as a snack bar) onto the wrapper 11 and, more specifically, onto the non-adhesive central portion 40 of the bottom layer 12 as shown in FIG. 5C.

Step 4: Fold and press the adhesive wrapper 11 together in a manner to form a fin seal 52 and two end seals 54, thereby creating a wrapped article 56 as shown in FIGS. 5D and 5E.

Alternative Embodiment

Figure 6:
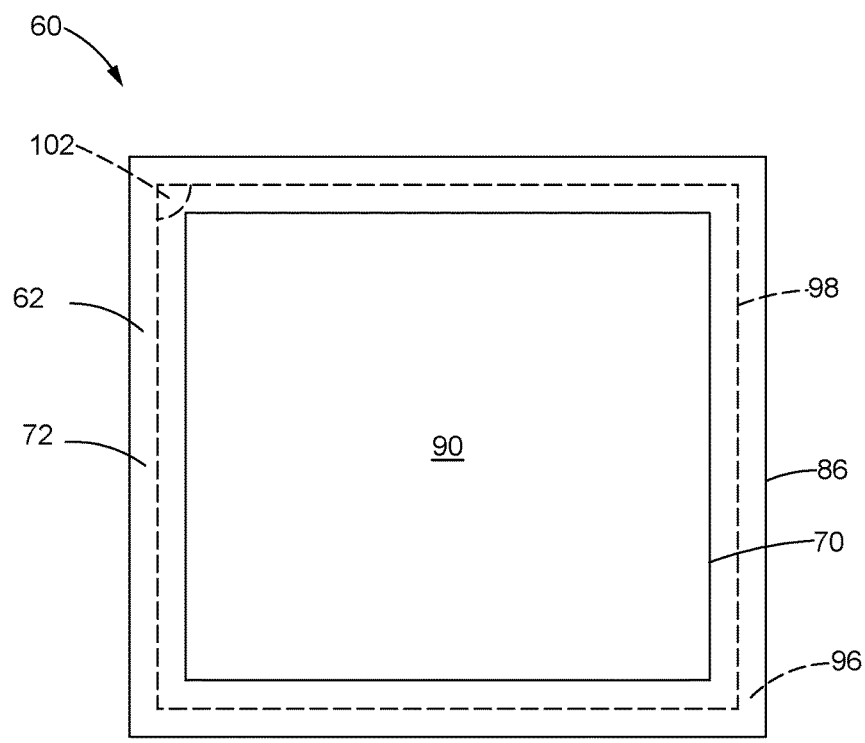
FIG. 6 is a bottom view of an alternative embodiment of a wrapper according to the disclosure.

FIG. 6 is bottom view of an alternative embodiment of a precision scored wrapper 60 for use in wrapping an article 50. The wrapper 60 comprises a precision scored laminated film having a bottom layer 62, a top layer 68 and an adhesive layer 64 disposed between the bottom layer 62 and the top layer 68.

The bottom layer 62 has a perimeter 86 such as the rectangular perimeter shown in FIG. 6. The bottom layer 62 is die-cut or otherwise scored to create one or more removable peripheral portions 72. For example, in FIG. 6 the bottom layer 62 includes a rectangular die cut 70 which divides a peripheral portion 72 of the bottom layer 62 from a rectangular central portion 90 of the bottom layer 62.

The die cut 70 can be any suitable shape, including the rectangular shape shown in FIG. 6. The perimeter of the bottom layer die cut 70 is smaller than the overall perimeter 86 of the bottom layer 62 and thus defines an inner boundary of the bottom layer peripheral portion 72. The continuous rectangular die cut 70 also defines a bottom layer central portion 90 that preferably remains adhered to the top layer 68 at all times.

Figure 9:
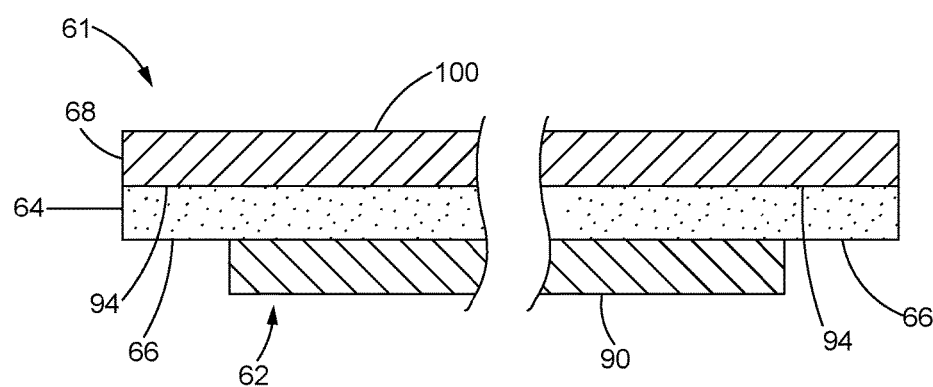
FIG. 9 is a cross-sectional view of the wrapper of FIG. 8 after the peripheral portions of the top layer and the bottom layer have been removed.

The adhesive layer 64 comprises at least in part a pressure sensitive adhesive (PSA). The PSA may be applied to the entire underside 74 of the top layer 68 or pattern applied to just part of the underside 74. For example, the PSA can be pattern applied to the underside 74 of the inner peripheral portion 94 of the top layer 68 in a rectangular ring-like pattern corresponding to the top layer inner peripheral portion 94. When, the perimeter of the wrapper 60 is removed (as shown in FIG. 9) the top layer inner peripheral portion 94, and the PSA disposed on it, are exposed.

In this embodiment another adhesive, such as a permanent adhesive, may be disposed between the bottom layer 62 and the top layer 68 in the area corresponding to the bottom layer central portion 90 to permanently adhere the bottom layer central portion 90 to the top layer 68. Also, a permanent adhesive may be disposed between the bottom layer 62 and the top layer 68 in the area corresponding to the outer peripheral portion 96 of the top layer 68 to permanently adhere the bottom layer peripheral portion 72 to the top layer outer peripheral portion 96.

Figure 7:
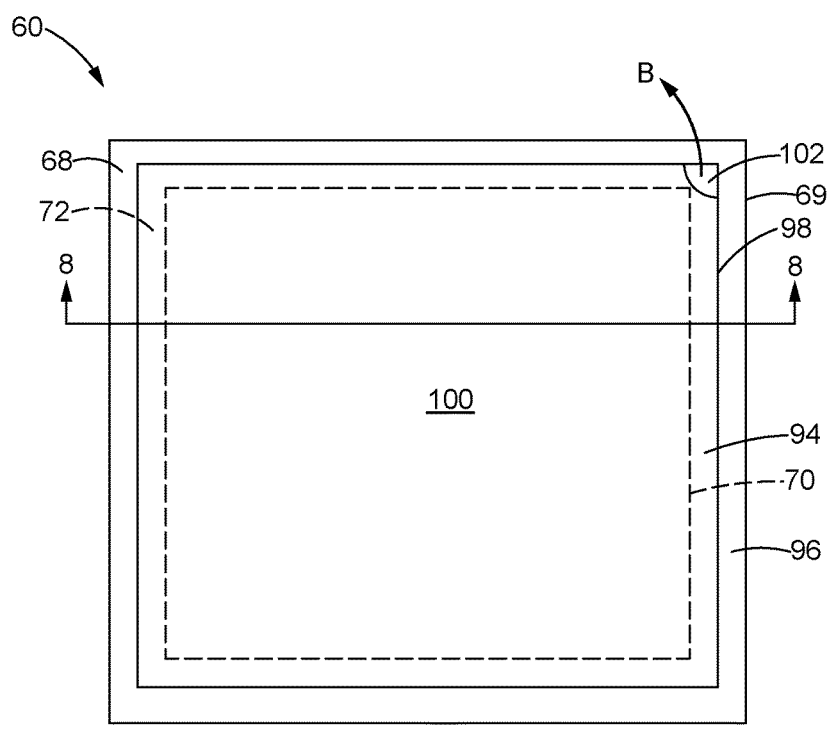
FIG. 7 is a top view of the wrapper of FIG. 6.

FIG. 7 is top view of the wrapper 60 of FIG. 6. In the illustrated embodiment the top layer 68 comprises a rectangular central portion 100 that is coextensive with the central portion 90 of the bottom layer 62, an inner peripheral portion 94 surrounding the central portion 90, and an outer peripheral portion 96 surrounding the inner peripheral portion 94. In a departure from the previous embodiment, the top layer 68 includes a rectangular die cut 98 which divides the top layer outer peripheral portion 96 from the top layer inner peripheral portion 94.

As explained below, when the central portion 100 of the top layer 68 is removed, a portion of the underlying adhesive layer 64 and the central portion 90 of the bottom layer 62 are also removed, leaving an adhesive wrapper 61 and a laminated ring-like structure 104 that can be discarded.

The top layer die cut 98 may be in the form of the rectangular shape shown in FIG. 7 or any suitable form. The top layer die cut 98 has a smaller perimeter than the top layer perimeter 69 but a larger perimeter than the bottom layer die cut 70.

The PSA layer 64 is directional. That is, the PSA preferentially adheres to the surface on which it is applied, which in this embodiment is the underside 74 of the top layer 68. When the top layer 68 and the bottom layer 62 are pulled apart, the PSA will preferentially be retained by the top layer 68. Accordingly, it is easier—and neater—to pull the top layer 68 off the bottom layer 62 than the other way around. Also, when the when the central portion 100 of the top layer 68 is removed, the PSA inner peripheral portion 66 remains adhered to the top layer 68 and thus to the adhesive wrapper 61, rather than to the discard ring 104.

Figure 8:
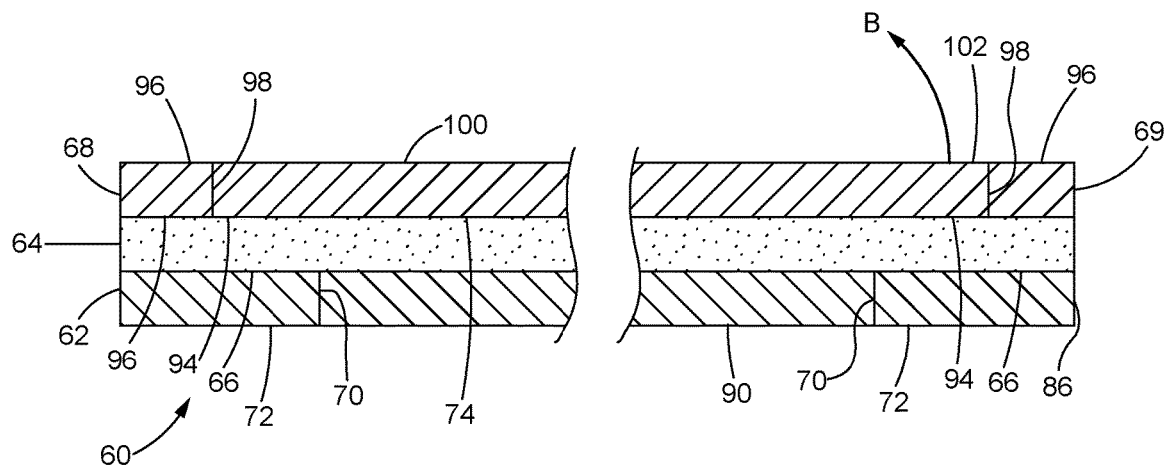
FIG. 8 is a cross-sectional view of the wrapper of FIG. 7 taken along line 8-8.

FIG. 8 is a cross-sectional view of the wrapper 60 of FIG. 7 taken along line 8-8. Here again the top layer die cut 98 has a smaller perimeter than the bottom layer perimeter 86 but a larger perimeter than the bottom layer die cut 70.

FIG. 9 is a cross-sectional view of the adhesive wrapper 61 created by removing the central portion 100 of the top layer 68 and discarding the ring-like peripheral structure 104. The central portion 100 is removed by pulling the central portion 100 in the direction of arrow (B) in FIG. 6. The adhesive wrapper 61 is now ready to be used to wrap an article 50.

Method of Manufacture

The wrapper 60 is manufactured in the following manner:

Step 1: Apply an adhesive layer 64 comprising PSA and another adhesive to the underside 74 of a top layer 68. The PSA is pattern applied to the underside 74 of the top layer 68 along the inner peripheral region 94. A more permanent adhesive is applied to the underside 74 of the top layer 68 in the area corresponding to the bottom layer central portion 90 and to the outer peripheral portion 96 of the top layer 68. The underside of the top layer 68 may be printed with an ink layer to provide attractive and/or informative graphics that appear through the top layer 68 of the wrapped article 108. Also, the top side (outer facing side) of the top layer 68 can be printed with an ink layer and protective over-lacquer for attractive and/or informative graphics.

At least one corner 102 of the underside 74 of the central portion 100 of the top layer 68 is left adhesive free so that the bottom layer 62 does not adhere to the top layer 68 in this area, creating a means for pulling apart the bottom layer 62 and the top layer 68.

Alternatively, PSA is applied to the entire underside of the top layer 68, and the either bottom layer 62 or the top layer 68 is provided with one or more adhesive free pull tabs (not shown) extending beyond the die cut 98. The pull tabs are then used as a means for pulling the bottom layer 62 from the top layer 68.

Step 2: Adhere a bottom layer 62 to the top layer 68 to create a laminate film. The laminate film comprises the bottom layer 62 and the top layer 68 and the adhesive layer 64 interposed between the bottom layer 62 and the top layer 68.

Step 3: Transfer the laminate film to a cutting station and die cut the bottom layer 62 with die cuts 70 to create a bottom layer 62 having a central portion 90 and one or a removable peripheral portion 72. Preferably the die cutting process does not breach any of the other layers of the laminate film beyond the bottom layer 62.

Step 4: Die cut the top layer 68 with die cuts 98 to create a top layer 68 having a central portion 100 and an outer peripheral portion 96. The die cut film is now the finished wrapper 60.

Method of Use

As illustrated in FIG. 10, the wrapper 60 is used in the following manner:

Step 1: Lift the corner 102 of the central portion 100 of the top layer 68 in the direction of arrow (B) in FIG. 10A to separate the adhesive wrapper 61 from the discard ring 104. When the central portion 100 is pulled away from the bottom layer 62, the underlying adhesive layer 64 and the central portion 90 of the bottom layer 62 remain with the central portion 100, leaving behind the laminated ring-like structure 104 that can be discarded.

Step 2: Discard the ring-like structure 104 and keep the remaining adhesive wrapper 61.

Figure 10A:
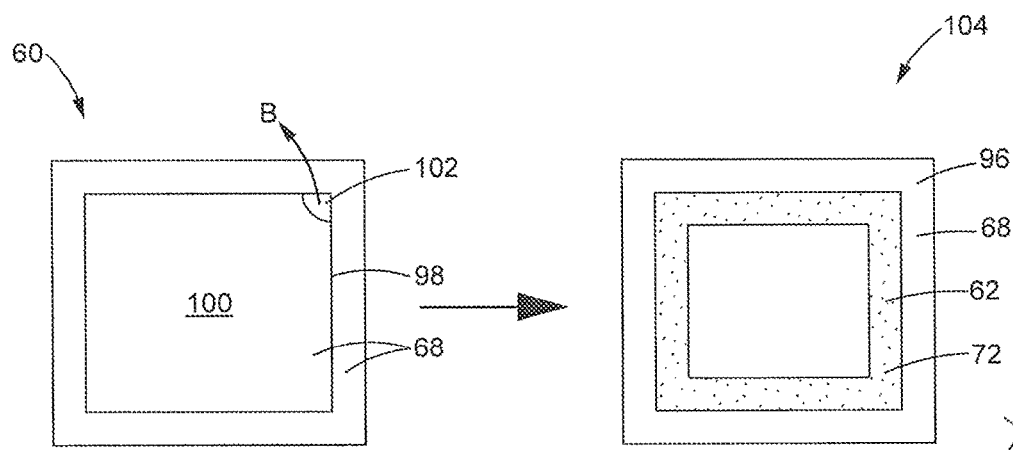
FIGS. 10A to 10E are a series of views showing how the wrapper of FIG. 6 is used to wrap an article.
Figure 10B:
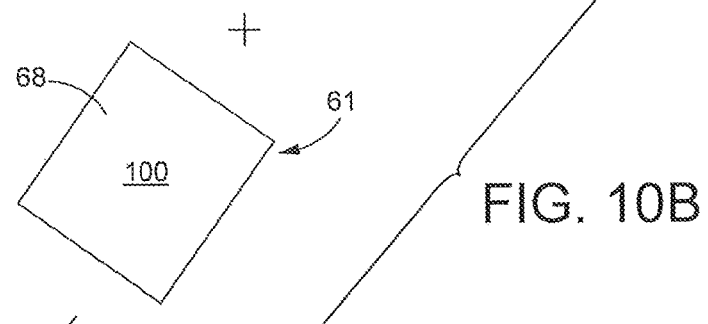
Figure 10C:
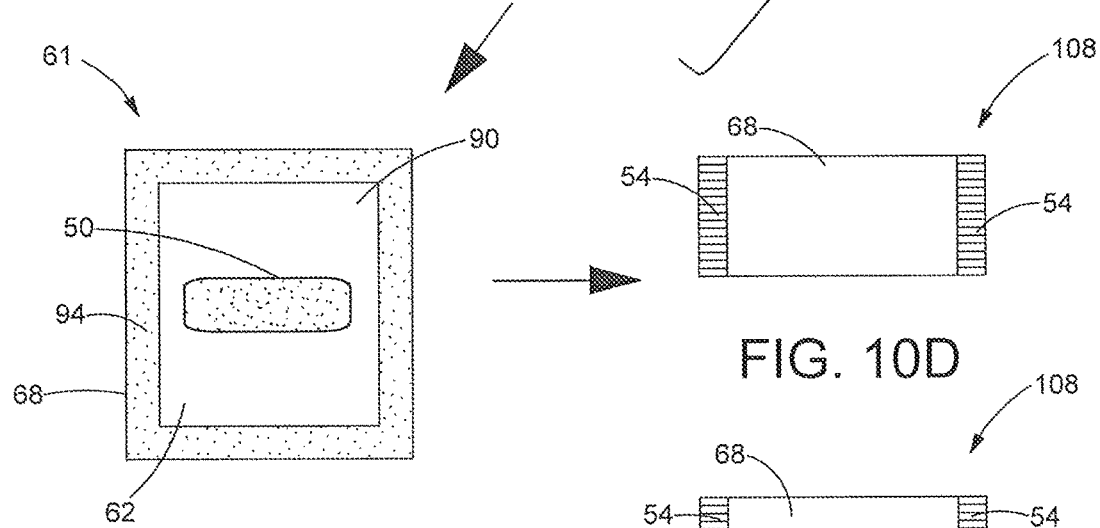

Step 3: Orient the adhesive wrapper 61 top layer 68 down on a flat surface. Place an article 50 (such as a snack bar) onto the central portion 90 of the bottom layer 62 as shown in FIG. 10C.

Figure 10D:
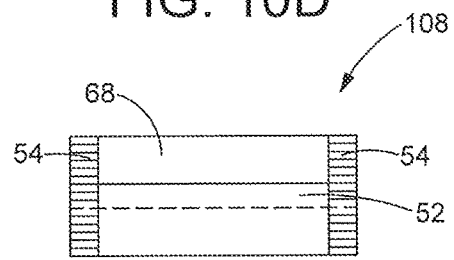
Figure 10E:

Step 4: Fold and press the adhesive wrapper 61 together in a manner to form a fin seal 52 and two end seals 54, thereby creating a wrapped article 108 as shown in FIGS. 10D and 10E.

It is understood that the embodiments of the invention described above are only particular examples which serve to illustrate the principles of the invention. Modifications and alternative embodiments of the invention are contemplated which do not depart from the scope of the invention as defined by the foregoing teachings and appended claims. It is intended that the claims cover all such modifications and alternative embodiments that fall within their scope.

The invention claimed is:

1. A two-dimensional, flexible, multi-layer wrapper for wrapping an article, the wrapper having a rectangular perimeter and comprising:
    a bottom layer of flexible film having a rectangular bottom layer free edge coextensive with the wrapper perimeter and a rectangular bottom die cut formed therein which divides the bottom layer into a bottom layer peripheral portion and a bottom layer central portion;
    a top layer of flexible film having a rectangular top layer free edge coextensive with the wrapper perimeter and comprising a top layer central portion that is coextensive with the bottom layer central portion, an inner peripheral portion surrounding the top layer central portion, and an outer peripheral portion surrounding the inner peripheral portion, the top layer further comprising a rectangular top die cut formed therein which divides the top layer outer peripheral portion from the top layer inner peripheral portion, the top layer having an underside that faces the bottom layer, the top layer die cut having a larger perimeter than the bottom layer die cut; and
    an adhesive layer disposed between the bottom layer and the top layer, the adhesive layer comprising a pressure sensitive adhesive located adjacent the top layer inner peripheral portion and a permanent adhesive located adjacent the bottom layer central portion.

2. The wrapper of claim 1 wherein:
    the bottom layer and the top layer are coextensive.

3. The wrapper of claim 1 wherein:
    the pressure sensitive adhesive is applied to the underside of the top layer.

4. A method of making a two-dimensional flexible wrapper, the method comprising the steps of:
    providing a top layer of flexible film and a bottom layer of flexible film, each layer having a rectangular free edge, the rectangular free edges being coextensive;
    applying an adhesive layer comprising pressure sensitive adhesive and another-adhesive to an underside of the top layer by pattern applying the pressure sensitive adhesive to the underside of the top layer along an inner peripheral region and applying a permanent adhesive to the underside of the top layer in an area corresponding to a central portion of the bottom layer;
    adhering the bottom layer to the top layer to create a laminate film;
    forming a rectangular die cut in the bottom layer within the bottom layer free edge in which the die cut divides the central portion from a removable peripheral portion;
    forming a rectangular die cut in the top layer within the top layer free edge such that the top layer die cut has a larger perimeter than the bottom layer die cut and the top layer die cut divides the top layer into a central portion and a peripheral portion, thereby forming the wrapper.

5. The method of claim 4 further comprising the step of:
    printing an ink layer on the underside of the top layer.

6. The method of claim 4 wherein:
    the adhesive applying step is done in such a way that at least one corner of the underside of the central portion of the top layer is left adhesive free.

\* \* \* \* \*